(No Model.) 4 Sheets—Sheet 4.
J. H. BECKER.
CORN HARVESTER.
No. 574,471. Patented Jan. 5, 1897.
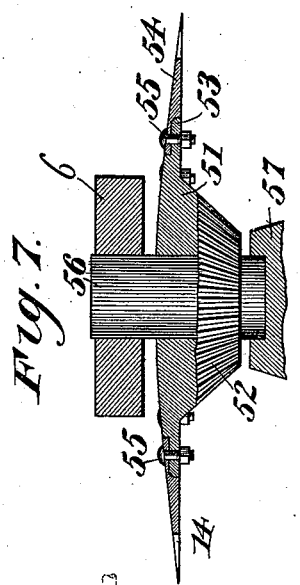
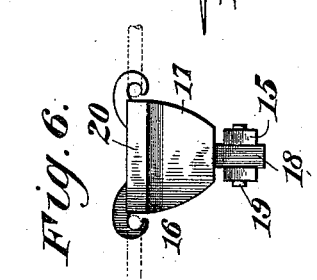
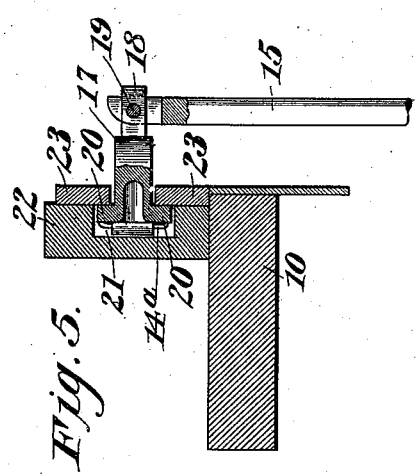
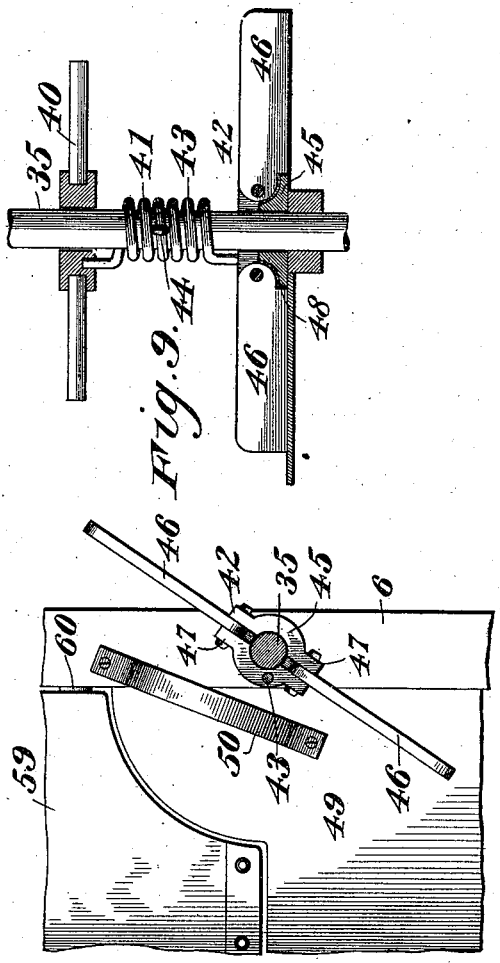
Inventor,
John H. Becker,
By his Attorneys,
Witnesses;

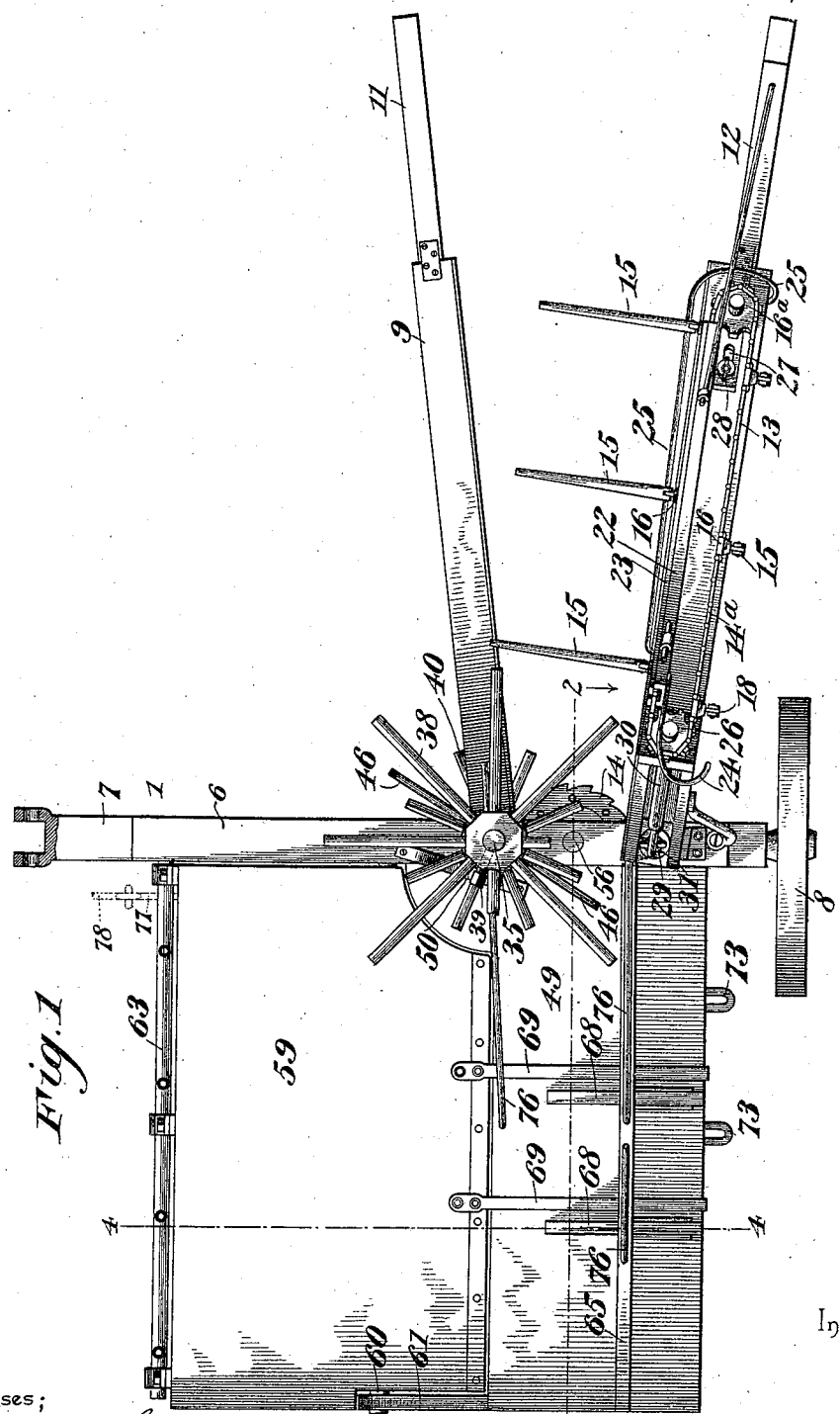

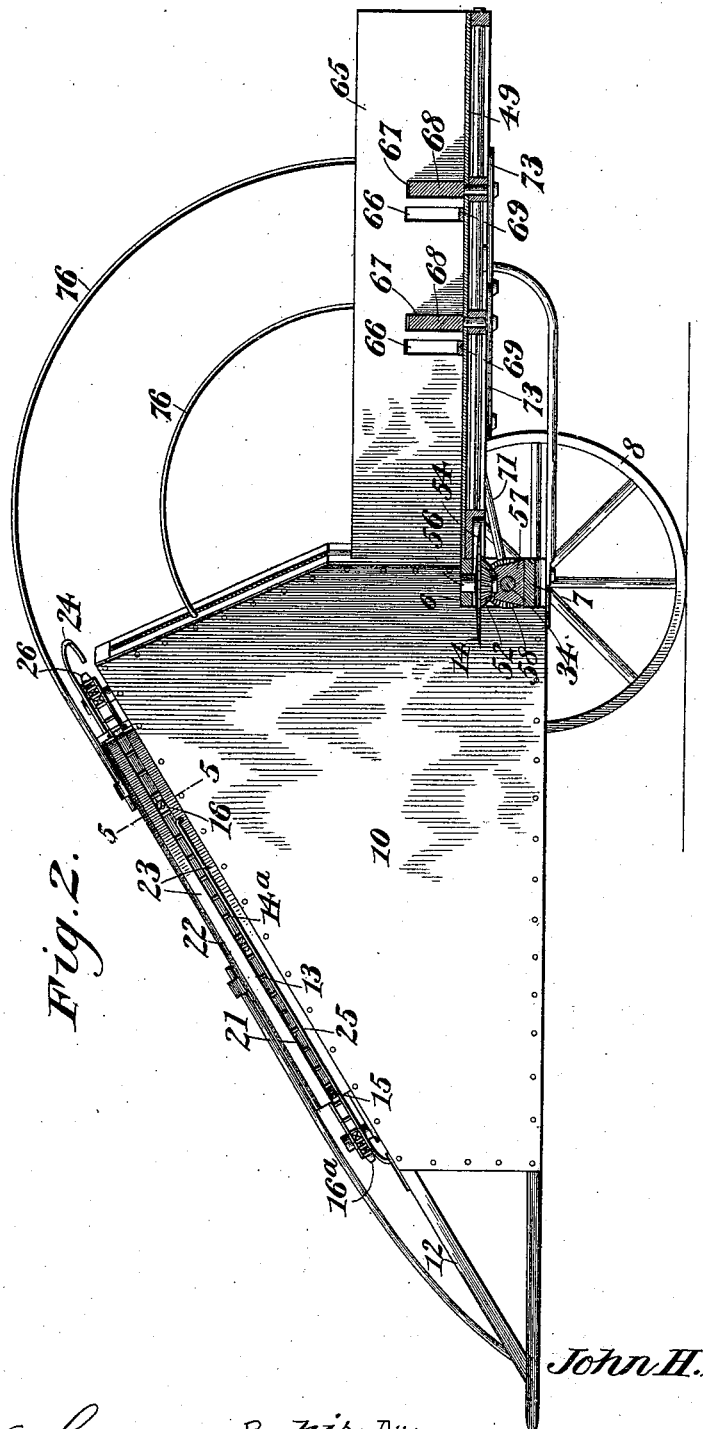

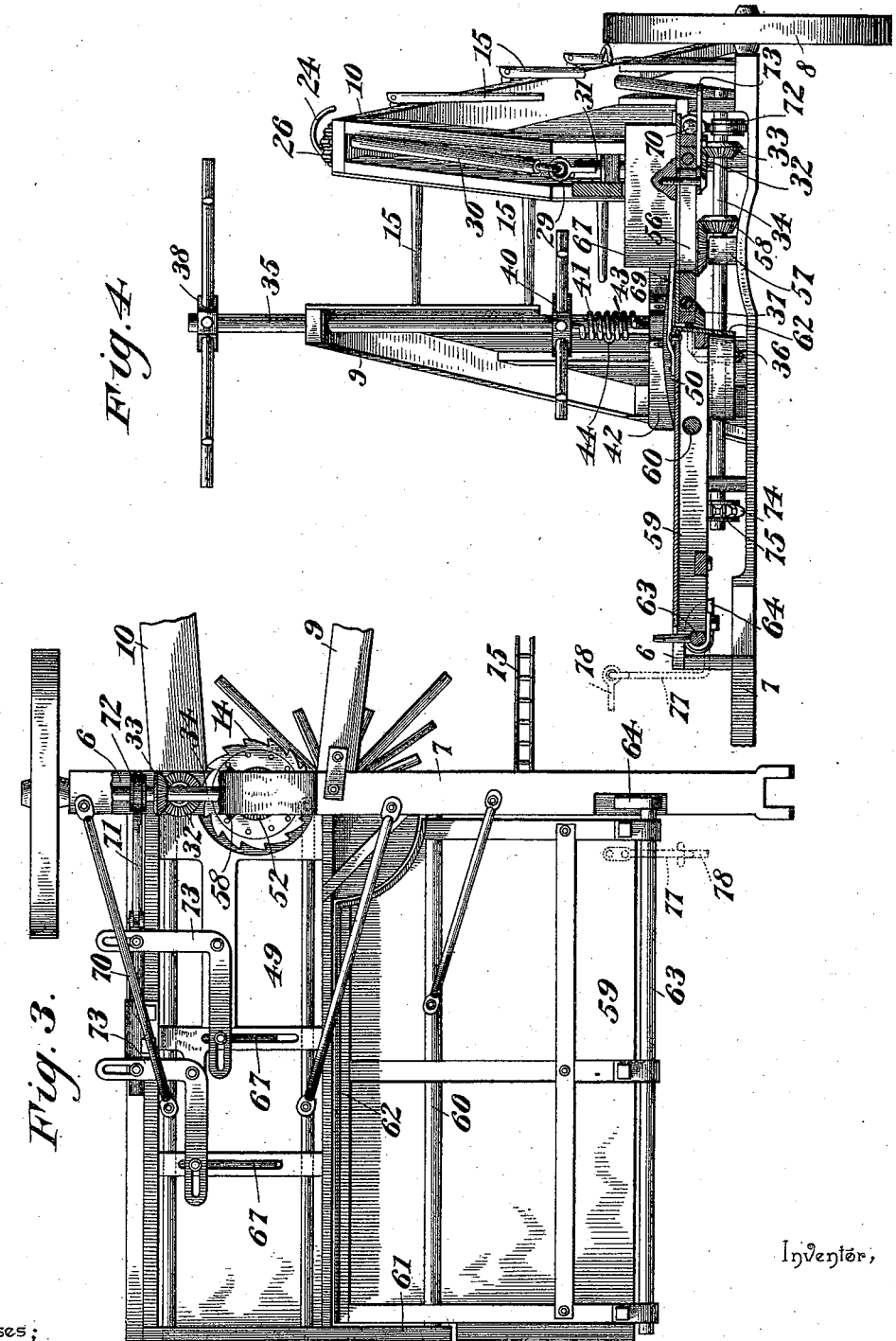

UNITED STATES PATENT OFFICE.

JOHN H. BECKER, OF COURTLAND, MINNESOTA.

CORN-HARVESTER.

SPECIFICATION forming part of Letters Patent No. 574,471, dated January 5, 1897.

Application filed March 15, 1895. Serial No. 541,905. (No model.)

*To all whom it may concern:*

Be it known that I, JOHN H. BECKER, a citizen of the United States, residing at Courtland, in the county of Nicollet and State of Minnesota, have invented a new and useful Corn-Harvester, of which the following is a specification.

This invention relates to that class of agricultural implements which are designed especially for cutting corn and similar stalky growths; and the object of the same is the provision of a machine which can be readily attached to the truck of a mower or like machine and derive power therefrom through suitable gearing, and which at the same time will be simple and capable of being manipulated by one person.

A further purpose of the invention is to devise a machine for the aforesaid purpose which will gather in the stalks and direct them to the cutter and provide means for causing the stalks to fall lengthwise upon the platform, where they will be subjected to the action of packers, which will force the stalks already cut out of the way of the newly-cut stalks and form them into a bunch of required size to be dumped when required.

For a full understanding of the invention reference is to be had to the subjoined description and the accompanying drawings, in which—

Figure 1 is a top plan view of a corn-harvesting machine embodying the vital features of the invention. Fig. 2 is a longitudinal section on the line 2 2 of Fig. 1, looking in the direction of the arrow. Fig. 3 is a bottom plan view of the machine, the front portions of the grain-boards being broken away and the covering or housing of the fixed part of the platform or table being removed. Fig. 4 is a cross-section on the line 4 4 of Fig. 1, looking to the right, parts being broken away for the sake of clearness in disclosing the relative disposition of the coöperating elements. Fig. 5 is a cross-section of the chain-reel and its guide on the line 5 5 of Fig. 2 on a larger scale. Fig. 6 is a plan view of a link of the chain-reel to which an arm is pivotally attached. Fig. 7 is an enlarged detail view in section of the cutter and its supports. Fig. 8 is a plan view in detail of the butt-reel. Fig. 9 is a detail view of the lower portion of the reel-shaft, showing the means for attaching the lower reel and the butt-reel thereto.

The front sill or beam of the machine comprises approximately-parallel bars 6 and 7, the latter being constructed at one end for attachment to the truck of a mower or other farm implement and having the grain-wheel 8 at its opposite end. The grain-boards 9 and 10 are of similar construction, and comprise a light framework, which is covered on the inner side by sheet metal, preferably tin, so as to prevent the catching and hanging of stalks thereon. These grain-boards are attached at their inner ends to the sill or beam, and extend forwardly on divergent lines, so as to gather in the stalks which may be out of line.

The lower edges of the grain-boards occupy an approximately horizontal plane, and the upper edges incline forwardly and downwardly from the inner or rear ends, thereby giving to the grain-boards a substantially triangular form in side elevation, as shown most clearly in Fig. 2.

The front ends of the grain-boards have guards 11 and 12 attached thereto. These guards 11 and 12 form prolongations of the respective grain-boards 9 and 10, and are adapted to run close to the ground, so as to pick up any stalks that may be blown down or bent over from any cause and which would not be likely to be taken up by the machine if the grain-boards did not have the tapering form herein set forth.

One of the grain-boards, as 10, is provided with a chain-reel 13, which is adapted to move the stalks gathered between the grain-boards 9 and 10 toward the cutter 14. This chain-reel comprises an endless band 14$^a$ and arms 15, the latter having pivotal connection with the said endless band, so as to fold close against the grain-board when returning to an active position after having moved the stalks to the cutter 14.

The band 14$^a$ is preferably composed of a series of links, which are coupled together in any of the well-known ways. At proper intervals in the length of the band links 16, of peculiar formation, are located and have the arms 15 pivotally attached thereto. These links 16 have lateral extensions 17 and short projections 18, to which latter the arms 15 are pivotally connected. The arms 15 are cleft at their inner ends and embrace the sides of the projections 18, to which latter they are secured by means of pivots 19. The inner lower corners of the arms 15 are rounded so as to admit of the said arms assuming a vertical position when traveling from the inner end of the grain-board to the forward end thereof. Vertical flanges 20 are provided at the inner ends of the lateral extensions 17, and are adapted to operate in a guide 21, formed in the inner side of a bar 22, attached to the upper end of the grain-board 10. This bar 22 has the guide 21 formed therein by being grooved, and strips 23 are secured to the bar 22 and project a short distance from the side walls of the groove 21, so as to engage with the flanges 20 and retain the links 16 in operative relation.

The arms 15 may be of any desired length, and in operation project across the space between the grain-boards 9 and 10 and travel from the front to the rear ends of the said grain-board, so as to move the stalks to the cutter 14. When the arms reach the inner end of the grain-board 10, they are engaged by a curved rod 24, which deflects them from a horizontal to a vertical position, and as they pass around the front end of the grain-board 10 the said arms are engaged by a corresponding rod 25, which again compels the arms to assume a horizontal position, so as to engage with the stalks for the purpose aforesaid. In the event of the arms being shorter than the distance between the forward portions of the grain-boards the rod 25 is extended rearwardly a sufficient distance to support the arms 15 in a horizontal position until their outer ends engage with the opposite grain-board 9, by means of which they are supported. This is clearly indicated in Fig. 1.

It will be seen that the chain-wheel operates in a plane corresponding with the inclined edge of the grain-board. Hence when the arms 15 engage with stalks that have fallen or been bent over they will carry the same rearwardly in a positive manner to the cutter 14. A sprocket-wheel 16ª is provided near the front end of the grain-board 10 to sustain the front portion of the chain-reel, and a similar sprocket-wheel 26 is located at the inner or rear end of the grain-board to support the rear portion of the said chain-reel. The front sprocket-wheel 16ª is mounted in a bearing having a slot 27, which is adjustably connected with the grain-board 10 by means of a binding-screw 28. By this means the sprocket-wheel 16ª can be adjusted to attain the required tension upon the chain-reel 13. The shaft 30 of the sprocket-wheel 26 inclines from the perpendicular a sufficient distance to have it occupy a position at right angles to the length of the chain-reel 13, and its lower end is connected to a short vertical shaft 31 by means of a universal joint 29, which in the present instance consists of interlocking eyes, and the lower end of the shaft 31 is provided with a beveled gear-wheel 32, which meshes with a corresponding beveled gear-wheel 33 on a transverse shaft 34, by means of which motion is imparted to the said chain-reel in the active operation of the machine.

A reel-shaft 35 is journaled near its upper end in the frame of the grain-board 9 and at its lower end in the bar 6, and is operated from the shaft 34 by means of bevel-gearing 36 and 37, provided, respectively, on the shafts 34 and 35. A reel 38 of ordinary construction is adjustably mounted upon the upper portion of the shaft 35, and is held in the located position by means of a binding-screw 39, which passes through the hub of the reel and is adapted to bear laterally against the side of the shaft 35. A corresponding reel 40 is mounted upon the lower portion of the shaft 35 in such a manner as to turn loosely thereon, and is yieldingly connected with the shaft 35, so as to rotate therewith, by means of a coiled spring 41, one end of the latter being attached to the shaft 35 and the other end secured to the hub of the reel 40. Under normal conditions the arms of the reels 38 and 40 are in vertical relation, so that corresponding arms will engage with the stalks and carry the latter to the cutter 14 in vertical position. A butt-reel 42 is mounted upon the lower portion of the reel-shaft 35, and is caused to revolve therewith by means of a coiled spring 43, one end of the latter being attached to the shaft 35 and the other end to the said butt-reel. In the preferable form of construction the springs 41 and 43 will be integrally formed, being end portions of a single coiled spring, which latter is attached midway of its ends to the shaft 35 by a staple or other fastening 44. This butt-reel is composed of a hub 45 and sweeps 46, the latter being pivotally attached at their inner ends between ears 47, extending laterally from the hub 45. A shoulder 48 is formed at the inner end of each sweep 46 and engages with a corresponding shoulder of the hub 45, by means of which the said sweeps are limited in their downward movement, but are free to move vertically. These sweeps 46 operate in a plane close to the cutter 14 and move the butts of the stalks onto the platform 49 after being severed from the root portions. An inclined strip 50 is disposed at the front end of the platform 49 to engage with the sweeps 46 and cause the outer portions thereof to rise vertically and disengage themselves quickly from the stalks as the latter are swept upon the platform 49.

The cutter 14 is composed of a hub portion 51, having integrally formed therewith a bevel gear-wheel 52 and an outer flange 53 and a toothed cutting-rim 54, which is fitted upon the flange 53 and secured thereto by bolts or like fastenings 55. The upper surfaces of the hub portion 51 and the cutting-rim 54 are flush, so as not to offer any obstruction to the passage of the stalks when the latter are swept over the said cutter onto the platform. A pin 56 passes loosely through the upper bar 6 and the hub 51, and is supported at its lower end in a step 57, placed upon the lower bar 7. This pin 56 is capable of being readily displaced by upward movement, so as to admit of the removal of the cutter 14 for purposes of sharpening, cleaning, and repairing. A bevel gear-wheel 58 on the shaft 34 meshes with the bevel gear-wheel 52 and serves to transmit motion to the cutter 14 when the machine is in operation.

The platform or table comprises a relatively-fixed part 49, which is firmly attached to the sill or beam, and a tilting part 59, the latter being mounted upon a bar 60, which is supported at its front end by means of the beam and at its rear end in a lateral extension 61 of the part 49. The rod 60 is located near the inner edge of the tilting table 59 and passes through cross-bars forming the frame of the said tilting table. An apron 62 depends from the inner edge of the tilting table 59 and is adapted to prevent the lodgment of stalks between the opposing edges of the parts 59 and 49 when the table 59 is tilted. This apron 62 is of stout sheet metal, possessing sufficient elasticity to maintain engagement with the edge of the platform 49 during the entire tilting movement of the table 59, so as to preclude the possibility of any stalks or blades coming between the edges of the parts 59 and 49 or beneath the said tilting table 59 when the latter occupies a tilting position. A guard 63 is located at the outer or dumping side of the tilting table 59 and comprises a suitably-journaled shaft having teeth projecting therefrom. One end of the guard is provided with a trip 64, which is curved on one side and adapted to engage with the under side of the bar 6, by means of which the said guard is held in such relative position that its teeth will occupy a vertical position when the table 59 is normally in place. On tilting the table 59 the weight of the stalks thereon will turn the guard out of the way, and on bringing the tilting table back to a normal position the curved side of the trip 64 will engage with the bar 6 and cause the guard to assume an operative position to prevent the stalks from falling over the rear edge of the tilting table 59.

A board 65 rises vertically from the outer edge portion of the platform 49 and occupies a position in line with the active portion of the grain-board 10. Vertical slots 66 and 67 are provided in the lower edge portion of the vertically-disposed board 65, and packers 68 operate through the slots 67, and guard-arms 69 operate in the slots 66. These guard-arms 69 are secured to the inner edge portion of the tilting table 59 and are adapted to project above the top edge of the packers 68 when the table 59 is tilted, so as to prevent the operation of the said packers upon the stalks, the latter being held above the platform 49, so as not to be engaged by the operating ends of the said packers 68. These guard-arms 69 are flexible to admit of their bending when the table 59 is tilted. A reciprocating bar or rod 70 is suitably mounted beneath the outer edge portion of the platform 49 and is connected by a pitman 71 with an eccentric 72 on the shaft 34 as a means for imparting a reciprocatory movement to the packers 68 through the instrumentality of bell-crank levers 73, which have their end portions slotted to receive the respective fastenings by means of which attachment is had between the said bell-crank levers and the parts 68 and 70. In the operation of the packers and the part 70 the connections between said parts and the bell-crank levers 73 operate in the slotted end portions of the said bell-crank levers 73, whereby binding action is obviated.

The shaft 34 is provided with a sprocket-pinion 74, which is operatively connected with a rotating part of a truck or other farm implement to which the machine may be attached by means of a sprocket-chain 75 in any desired and convenient manner. It will thus be seen that when the shaft 34 is rotated the several parts, such as the reels, the butt-reel, the chain-reel, the cutter, and the packers, will be actuated to perform the several functions for which they are specially provided. As the machine is advanced over the field the stalks are gathered in between the grain-boards 9 and 10 and are engaged by the arms of the chain-reel and moved in a positive manner to the cutter 14. As soon as the advancing stalks are engaged by the reels 38 and 40 they are relieved from the action of the chain-reel. In order to prevent bending of the stalks or any undue straining of the reel 40, the latter is yieldingly connected to its shaft 35 in the manner set forth. Hence should the movement of the reel 40 be retarded by the stalks the shaft 35 will continue to revolve at a normal speed, and after the stalks are cut the said reel 40 will regain itself under the tension of the spring 41 and give to the butt-ends of the stalks a flirting movement, which will throw them upon the platform 49 with a quick movement.

The action of the butt-reel 42 is similar to that of the lower reel 40 so far as advancing the butt-ends of the stalks is concerned. The sweeps of the butt-reel operate in close proximity to the cutter 14 and serve to hold the stalks during the action of the cutter, and the instant the cut is effected the butt-reel serves, in conjunction with the reels 38 and 40, to move the stalks upon the platform 49. The stalks fall lengthwise upon the platform 49 and are subjected to the action of the packers 68, which form them into bunches. Suitable guards 76 are provided to prevent the stalks from falling crosswise upon the platform. It will be understood that the several parts will be strongly and firmly braced by suitable stays, which will be located so as to attain the best possible results. After the bunch of stalks has reached a sufficient size the table 59 will be tilted by means of a suitable lever (not shown) within convenient reach of the driver on the truck or machine to which the present implement is attached, said lever being connected by means of a rod 78 to a lever 77, attached to the tilting table 59.

In constructing a machine in accordance with the invention it is obvious that changes in the form, proportion, and the minor details of construction may be resorted to without departing from the principle or sacrificing any of the advantages of this invention.

Having thus described the invention, what is claimed as new is—

1. In a corn-cutting machine, the combination of forwardly-extending grain-boards having their top edges inclining upwardly and rearwardly from their front ends, a bar attached to the top edge of one of the grain-boards and grooved in the side facing the opposite grain-board, a chain-reel comprising links and having some of the links formed with oppositely-extending vertical flanges which operate in the groove of the said bar, and with lateral extensions terminating in outward projections, strips attached to the vertical side of the aforesaid bar above and below the groove therein and extending over the said groove a short distance so as to engage with the vertical flanges of the chain-reel links, and providing a space in which operate the said lateral extensions, arms having their inner ends cleft and pivotally connected with the said outward projections, and a rod arranged to support the said arms in a horizontal position during their travel through the space formed between the grain-boards, said rod having its end portions curved, substantially in the manner set forth for the purpose described.

2. In a corn-cutting machine of the character specified the combination with the reel-shaft, and a reel loosely mounted upon the said shaft, of a spring having positive connection with the reel and its shaft and adapted to permit a yielding of the reel when subjected to abnormal strain and to return the said reel to a normal position with respect to its supporting-shaft after the abnormal strain has been removed from the reel, substantially as set forth.

3. In a grain-cutting machine the combination with the reel-shaft of a coiled spring mounted upon the reel-shaft and firmly attached thereto midway of its ends, and reels loosely mounted upon the said shaft, one on each side of the said spring and having positive connection with the ends thereof, whereby each reel is adapted to yield independently of the other, and whereby both reels are returned to a normal position with respect to their supporting-shaft when relieved of abnormal stress, substantially as set forth for the purpose described.

4. In a grain-cutting machine the combination with the frame, and a tilting table, of a guard journaled at the delivery end of the said table and comprising a shaft having teeth projecting therefrom, a trip firmly attached to the said shaft and having its upper side curved to engage with a portion of the frame and turn the shaft in its bearings to project the teeth thereof into working position, substantially as set forth for the purpose described.

5. In a grain-cutting machine, the combination of a relatively-fixed platform, a tilting table forming a part of the platform, the opposing ends of the platform and table coming close together, and an apron secured to the tilting table and consisting of sheet metal possessing sufficient elasticity to maintain engagement with the edge of the platform during the entire tilting movement of the said table, substantially in the manner set forth for the purpose described.

6. In a grain-cutting machine, the combination with a relatively-fixed platform and a tilting table, of packers operating on the platform, and guards attached to the tilting table and adapted to prevent the active operation of the said packers when the table is tilted, substantially as set forth.

In testimony that I claim the foregoing as my own I have hereto affixed my signature in the presence of two witnesses.

JOHN H. BECKER.

Witnesses:
CHAS. HENUL,
ALBERT LINSTROM.